United States Patent [19]
Santelmann, Jr.

[11] Patent Number: 4,757,433
[45] Date of Patent: Jul. 12, 1988

[54] POWER SUPPLY

[75] Inventor: William F. Santelmann, Jr., Lexington, Mass.

[73] Assignee: Display Components, Inc., Westford, Mass.

[21] Appl. No.: 1,260

[22] Filed: Jan. 7, 1987

[51] Int. Cl.⁴ ............................................. H02M 3/338
[52] U.S. Cl. .................................... 363/19; 363/56; 331/117 FE
[58] Field of Search .................................. 363/18–19, 363/56, 97; 331/112, 113 R, 117 R, 117 FE; 361/86–87, 91

[56] References Cited

U.S. PATENT DOCUMENTS

| | | | |
|---|---|---|---|
| 3,624,541 | 11/1971 | Lundstrom | 331/117 FE |
| 3,681,674 | 8/1972 | Terry, Jr. | 363/18 |
| 4,321,507 | 3/1982 | Bosnak | 363/19 X |
| 4,323,961 | 4/1982 | Josephson | 363/56 |
| 4,371,919 | 2/1983 | Andrews et al. | 363/65 |
| 4,386,394 | 5/1983 | Kocher et al. | 363/20 |
| 4,389,702 | 6/1983 | Clemente et al. | 363/21 |
| 4,594,649 | 6/1986 | Rhoads et al. | 363/56 |
| 4,605,999 | 8/1986 | Bowman et al. | 363/19 |
| 4,616,300 | 10/1986 | Santelmann, Jr. | 363/21 |

FOREIGN PATENT DOCUMENTS

| | | | |
|---|---|---|---|
| 0116070 | 7/1983 | Japan | 363/19 |
| 0046772 | 3/1985 | Japan | 363/19 |
| 0096178 | 5/1985 | Japan | 363/18 |
| 0180473 | 9/1985 | Japan | 363/19 |

OTHER PUBLICATIONS

Terman, "Radio Engineer's Handbook", 1st Edition, McGraw-Hill Book Company, Inc., N.Y., 1943, p. 480.

Primary Examiner—Peter S. Wong
Attorney, Agent, or Firm—Schiller, Pandiscio and Kusmer

[57] ABSTRACT

A power converter, particularly adapted for supplying high voltage power for a CRT, for converting an unregulated level of input power to a regulated level of output power is described. The power converter includes a self-excited sinusoidal power oscillator comprising a transformer which has a secondary winding that resonates at a resonating frequency in response to the input signal and a field effect transistor connected to operate as a Class C amplifier. The field effect transistor is connected so that both the drain and gate voltages can both be provided by the primary windings of the tranformer and oscillate at the resonant frequencies so that the positive peak gate voltage can be used to control the output of the power oscillator, which in turn controls the power output of the converter. The gate of the FET is connected to a control bus which in turn can be connected to controls for controlling the control signal in accordance with any one of a plurality of control conditions.

24 Claims, 2 Drawing Sheets

POWER SUPPLY

The present invention relates in general to power supplies, and more particularly to an improved DC power converter for converting an unregulated level of DC input power to a regulated level of DC or AC output power.

It is often desirable to provide power at a desired regulated level. Frequently, however, the available power is not regulated nor at the desired level so that a power converter must be utilized to convert and regulate the power level delivered to a specific load. For example, a relatively high regulated AC voltage is necessary to erase an electrostatic charge in electrostatic copiers. On the other hand a relatively high regulated DC voltage, is required to pulse a laser. A relatively high regulated DC voltage, usually at low current levels, is also needed to accelerate the electron beam of a cathode ray tube (CRT). In the latter case the required DC voltages can vary, for example, from less than 1 kilovolt (Kv) for the smallest tubes, up to 50 Kv, or more, for tubes of the projection type and those employing extremely fast writing speeds. Of particular interest are the direct view monochrome CRTs, which typically require regulated voltages of between about 16 Kv and 20 Kv, at maximum power levels of up to 10 watts (which equals current levels of between 0.625 and 0.5 milliamps). In all of these devices it is preferred that the voltages provided are held at precise levels so that accurate and stable operation of the electrostatic copier, laser or CRT is achieved.

Power supplies for converting the unregulated level of input power to a regulated output power level are certainly well known. See, for example, U.S. Pat. Nos 4,321,507 (Bosnak); 4,323,961 (Josephson); 4,371,919 (Andrews et al.); 4,386,394 (Kocher et al.); 4,389,702 (Clemente et al.); 4,594,946 (Rhoads) and my previously filed U.S. Pat. No. 4,616,300 (Santelmann, Jr.). The devices shown in these patents employ a high power oscillator including a switch in the form of one or more transistors connected to a transformer winding. The switch is turned on and off at the oscillating frequency to achieve very high power conversion efficiencies. The switching transistors are operated in either one of two ideal states, a saturated state when on and a non-conductive state when off. When the transistor switch is closed (and provides approximately zero impedance between its main terminals), power is transferred to the transformer via the primary winding of the transformer. When the transistor opens (and provides approximately infinite impedance) and conduction in the primary winding has ceased, the stored power in the transformer primary is coupled out through the secondary winding to an output load. This cycle is repeated at the oscillating frequency.

Regulation of the output level is accomplished by controlling the amount of energy stored in the magnetic field of the primary coil of the transformer during each cycle. Usually, this latter function is controlled by the on-time and off-time of the transistor switch during each cycle, i.e., the phases of each cycle of the oscillating signal in which the transistor switch is turned on and off. The high-frequency switch in this type of power converter can therefore be thought of as a phased controlled device.

As described in my previously filed U.S. Pat. No. 4,616,300, although high frequency switching has been efficiently utilized to provide low impedance, low voltage power converters, certain efficiencies may be lost when the principles of high frequency switching are applied to high impedance, very high voltage, very low current power supplies. However, certain efficiencies can be maintained if the storage inductance of a converter is allowed to resonate with its stray capacitance, permitting its voltage to change only as fast as its resonance will allow it. This is accomplished by injecting a controlled amount of energy into the resonant circuit, as reflected into the primary winding of the high voltage transformer, during each conversion cycle, and then allowing the resonant circuit complete freedom to resonate or "ring" for a time between a half-cycle and a full cycle. At the end of the conversion cycle, the initial energy, less the energy delivered to the load at the voltage peak and less the small circuit losses, is returned to the power source. Energy is transferred through the output rectifiers during both the positive and negative alternations of the resonating signal with the positive portion being provided from resonant "flyback" action, while that transferred on the negative portion being provided by ordinary transformer action.

The conversion frequency of the resonant flyback converter described in U.S. Pat. No. 4,616,300 is determined by a timing capacitor and resistor connected to the pulse width modulator used to control the switching of the transistor. Accordingly, the capacitor and resistor must be carefully adjusted in each converter to insure that the modulator generates the switch control signal at a conversion frequency substantially at the resonant frequency of the transformer for normal efficient power conversion. The costs associated with these adjustments can be justified for high level power requirements (where for example 100 to 200 watts are required, as in certain projection type CRTs) in view of the efficient energy conversion rate (85 to 90% power conversion efficiency) that is possible with this device, although at lower power conversion levels the added costs can not necessarily be justified, since power losses are not as critical.

In all of these converters there is a need for an independent driver for operating the converter as switching devices at the conversion frequency. These drivers add to the cost and complexity of the converters.

One type of converter which has been developed for high-voltage, low-current output, which does not require an independent driver for controlling a high frequency switch, includes a self-exciting, sinusoidal power oscillator which oscillates at the resonant frequency of the high-voltage secondary winding of the transformer. The self-exciting power oscillator includes a bipolar transistor connected to the primary winding of the transformer. The base of the transistor is driven by a current derived from a feedback winding of the transformer.

By variation of the average (DC) base current, the power level of the sinusoidal oscillator may be controlled at any level from essentially zero to a design maximum. If control of this average base current is provided by an error amplifier in a negative feedback arrangement, a regulated output may be obtained.

The power efficiency of this self-exciting sinusoidal power oscillator is compromised because the device requires a substantial amount of drive current for the base of the bipolar transistor, i.e., approximately 5% of the collector current; and therefore a significant amount of power is used just to drive the bipolar transistor.

Further, in applications requiring a very precise, regulated DC output power level, such as that required for the anode of a CRT, it is desirable to operate this self-exciting power oscillator at a resonant frequency as high as possible, since increasing the conversion frequency should result in a decrease in the amount of ripple appearing in the output power. Increasing the conversion frequency, however, decreases the number of turns required on the primary winding since it increases the amount of voltage per turn. For some applications, such as a power converter for CRTs having +24 VDC input, 16 Kv to 20 Kv output and a 100 kHz conversion frequency, this results in the ideal number of turns needed to drive the base of the bipolar transistor to less than one, which is of course impossible to implement. The voltage provided by a single minimum winding of the primary in such applications will be close to be or exceed the Zener semiconductor breakdown of the base to emitter junction of a standard bipolar transistor, typically at about 6 or 7 volts. As a result, it is usually necessary to use some type of attenuator, such as a resistor divider, to reduce the voltage provided by the primary winding to a manageable level for generating the driving current for the bipolar transistor. Such an attenuator is therefore a waste of power. Very clearly, the signal provided by the primary winding and the signal needed to drive the base of the bipolar transistor are not matched. Further, circuitry for regulating the current driving the bipolar transistor so as to regulate the power output of the converter can be complex, costly, and power consuming.

In addition this self-exciting sinusoidal power converter typically must be designed based on the power levels handled by the device. For example, a converter designed to operate at 1 or 2 watts of power must be redesigned to handle 10 watts since it is necessary to increase the power to drive the bipolar transistor. Similarly, additional specific design changes to increase the power to drive the bipolar transistor must be incorporated for the converter to handle 50 watts.

Further, control of the bipolar base drive current by one of a number of independent signals, such as a voltage regulator, current limiter or regulator, automatic over-voltage shutdown, or a remote on-off signal, to effect full adjustment of output from zero to rated level is complicated by the need for each control signal to provide significant current and power to the base circuit.

Frequently, all of these controls are desired. The voltage regulator may be used to establish a constant output voltage for operation of a CRT. The current limiter may be used to control converter power as the load impedance drops below normal toward, and possibly down to zero (a short circuit) and prevent converter damage. Such a current limiter is in fact a crude current-regulator. If desired, a current regulator may be designed with very high performance for operation as a constant-current output supply. In this case, the voltage regulator assumes a protective function limiting the output voltage with abnormally high-impedance loads, in of a functional "dual" of a current-limiter protecting a voltage regulator from abnormally low-impedance loads.

If the regulation system fails, it may send an erroneous control signal to the converter bringing it to its fullest possible output. This "overvoltage" (or "overcurrent") condition may lead to hazardous load conditions, such as overstress of high voltage insulation or generation of X-radiation in a CRT load. It is usually desirable to limit the maximum output developed in the event of regualtion failure, including alternate control by a secondary backup regulator or even complete shut-down by means of a regulation-failure detector.

Finally, on-off control of the power converter may well be desired from a remote source such as a computer TTL signal without buffering to a high current level.

Accordingly, it is an object of the present invention to provide an improved power converter which overcomes or reduces the above-noted problems of the prior art.

Another object of the present invention is to provide an improved regulated power converter of the self-exciting resonant type including a sinusoidal power oscillator adapted to be easily driven by a voltage at the level provided by a single turn of the primary winding of a transformer operating at a relatively high conversion frequency.

And another object of the present invention is to provide an improved power converter including an oscillator driven by a voltage, rather than a current, derived from the primary of a transformer at relatively high frequencies.

Yet another object of the present invention is to provide an improved regulated power converter in which various controls can be easily implemented for controlling the power provided by the oscillator to the primary of a transformer.

Still another object of the present invention is to provide an improved regulated power converter capable of handling a large range of power levels, without modification to the converter's control circuits.

And yet another object of the present invention is to provide an improved regulated power converter capable of faster regulation response times to changes in the load.

And still another object of the present invention is to provide an improved regulated power converter having simpler and more efficient voltage and current output controls so as to prevent the power converter from overheating.

And yet another object of the present invention is to provide an improved regulated power converter for use in driving a CRT adapted to prevent excessive X-ray emission by the CRT.

And still another object of the present invention is to provide an improved regulated power converter in which the output power can be easily controlled with a remote user control signal at TTL voltage and current levels.

And yet another object is to provide an improved power converter for generating a regulated DC voltage adapted, for example, to drive cathode ray tubes, or a regulated AC voltage adapted for example to discharge electrical charge on an electrostatic drum, or charge a laser capacitor.

And still another object of the present invention is to provide a DC high voltage power converter of the self-exciting resonant type in which an FET operating as a Class C amplifier is utilized to control the amount of energy injected into the resonating circuit.

And yet another object of the present invention is to provide a power converter including a Cockroft-Walton voltage-multiplying rectifier of one to a dozen or more stages connected to the resonant secondary of a transformer for providing a high-voltage output for use in powering the anode and various other electrodes of a CRT.

These and other objects are achieved by an improved power converter for converting an unregulated input power to a regulated output power. The power converter comprises:

input means for receiving said unregulated level of input power;

a self-excited, sinusoidal, power oscillator, coupled to said input means and including (1) signal resonating means for generating a sinusoidal signal at a predetermined frequency in response to said input power level, and (2) a field effect transistor, connected to operate as a Class C amplifier, for controlling the power output of said oscillator, said transistor including (a) a pair of main terminals, coupled to said signal resonating means so that the voltage across said main terminals varies as a function of said resonant frequency in response to said input power, and (b) a control terminal for controlling the operation of said transistor as a Class C amplifier so as to control the power output of said oscillator in response to and as a function of a drive signal;

means, responsive to said resonating signal, for generating said drive signal at said resonating frequency;

means for controlling said drive signal so as to control the power output of said oscillator; and output means, coupled to said oscillator, for providing said regulated output power level to a load as a function of the power output of said oscillator.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings, wherein.

The same numerals are used in the drawings to identify like parts.

Figure 1:
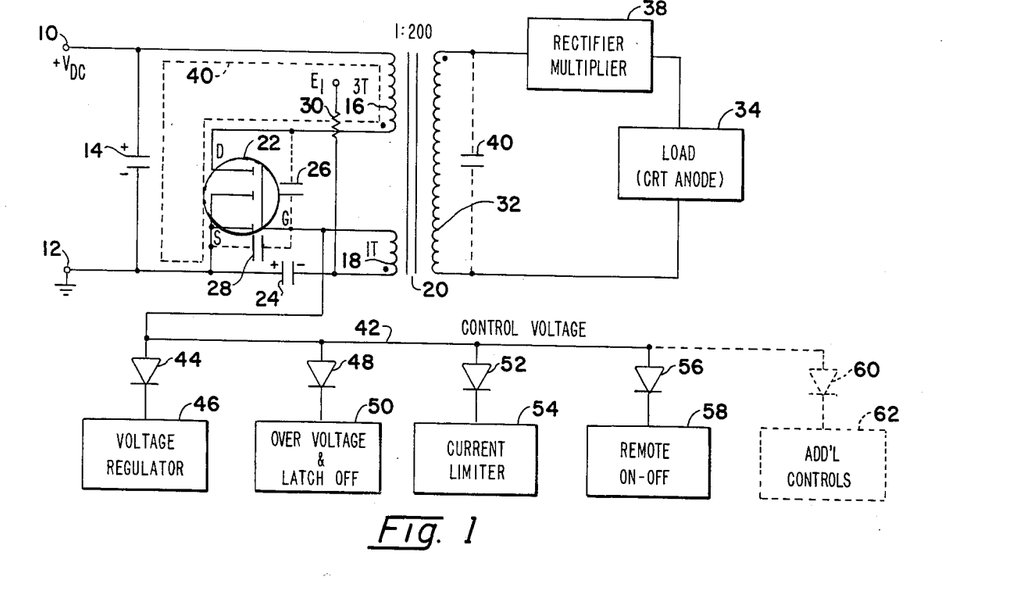
FIG. 1 is a partial schematic and partial block diagram of the preferred embodiment of the present invention.

Referring to FIG. 1, a simplified illustration of the preferred embodiment of the power converter of the present invention includes a pair of input terminals 10 and 12, adapted to receive an unregulated DC input signal with terminal 12 being connected to system ground. A by-pass capacitor 14 is connected across the input terminals.

The converter also includes a high Q resonance transformer 32 including two primary windings 16 and 18 and a secondary winding 32 all wound in the same direction and magnetically coupled to one another through a common transformer core. In the drawings, dots indicate terminals having the same polarity. The other terminals carry inverted polarities. One side of winding 16 is connected to terminal 10, while the ground side of winding 18 is connected through capacitor 24 to system ground. As will be more evident hereinafter, the storage inductance provided by the secondary winding together with the winding's stray capacitance 40 (including stray capacitance of any load or voltage multiplying rectifier) will resonate permitting its voltage provided across the winding to change as fast as its resonance will allow it. This is accomplished by injecting a controlled amount of energy into the resonant circuit, as reflected into the primary winding of the transformer, and allowing the resonant circuit complete freedom to resonate or "ring" in the manner of a Class-C oscillator. The actual resonant frequency is a function of the magnetizing inductance of the transformer as referred to any winding and the sum of all winding and load stray capacitances referred to the same winding. After these capacitances have been reduced as much as possible, this resonant frequency is adjusted by insertion of an air gap in the core to reduce and control inductance with a frequency in the order of 100 kHz being preferred.

In accordance with the present invention the power converter utilizes the resonance of a high-voltage secondary winding 32 to establish the oscillation frequency of FET 22. Only at this frequency will the conditions for oscillation exist, that is 180 phase shift and greater than unity gain from drain to gate. Preferably, FET 22 is a single gate, n-channel, enhancement type MOSFET, because of the operating characteristics of such devices, although other types of FETs can be utilized such p-channel and depletion type MOSFETs. As is well known the MOSFET includes a pair of main terminals [the source (S) and drain (D)] and a control terminal [the gate (G)]. The drain of the MOSFET is connected to the ground side of primary winding 16 while the supply terminal is connected to system ground.

FET 22 is connected to the second primary winding 18 in a manner similar to the Meissner type oscillator (see, for example, Terman, Frederick Emmons, Radio Engineer's Handbook, First Edition, McGraw-Hill Book Company, Inc., New York, 1943, page 480). The FET is biased so as to operate as a Class C power amplifier, wherein the gate-bias voltage value is considerably more negative than the drain-current cutoff point. The drain current accordingly flows for less than ½ of the signal alternation of the resonating signal in the primary winding. As is well known, Class C operation provides very efficient operation since the maximum drain current flows when the drain voltage is at a minimum.

In order to provide Class C operation, the gate is connected to the side of the primary winding 18 which delivers an inverted polarity form of the drain voltage, while the other side of this primary winding is connected to the capacitor 24, which in turn is connected to the source of the FET 22 at system ground. The capacitor 24 is provided to offset the gate input of the parasitic capacitances 26 and 28, respectively existing between the drain and the gate (typically about 30 pF) as magnified by the Miller effect, and between the gate and the source (typically between about 300 pF). The input capacitance at the gate of the FET due to these parasitic capacitances is in the order of 1000 pF, so the value of capacitor 24 should be about 10,000 pF so as to place most of the voltage provided from the primary winding 18 onto the gate. A voltage source $E_1$, including the resistor 30, is provided for raising the gate voltage above threshold for start-up of the oscillator at turn-on, and to provide a small forward bias current through the one control diode (44, 48, 52, 56, or 60) which has asserted control over the oscillator by virtue of its cathode voltage being lower than any other. Resistor 30, preferably a relatively large resistor for minimum power consumption, is connected at one end to a voltage source $E_1$ and at its other end to the junction between the capacitor 24 and the dot-polarity side of primary winding 18 of transformer 20. Typically, $E_1$ is +5 VDC and resistor 30 is 18 Kohms.

Preferably, the size and core material of the transformer and the number of turns of the primary windings 16 and 18 of transformer 20 are selected so as to provide the desired amplitudes of the drain and gate voltages. Preferably, the peak-to-peak amplitude of drain voltage required for normal output at full-load should be such as to always allow some positive drain-source voltage even at the lowest level of expected input at terminals 10 and 12 so that the FET will not reach saturation even if the input level drops to this lowest level, while the gate voltage should have a positive peak voltage which exceeds the gate threshold level of the FET but below the rated value, all of which will be more evident hereinafter. The ratio of the windings 16 and 18, for example, can be 3:1 so that for a +24 VDC input at terminal 10 the average voltage across the drain of FET 22 will be +24 volts DC, with a peak-to-peak value of approximately 40 volts, while the peak-to-peak voltage across the gate winding 18 will be one-third of that value, or 13.3 volts. Approximately 12.1 volts peak-to-peak will be placed on the gate while 1.2 volts peak-to-peak will appear on capacitor 24 as determined by the capacitance ratio between capacitor 24 and the gate.

The transformer 20 is designed to provide the power output level desired. The secondary winding 32 preferably is wound in the same direction as the primary windings. In the preferred embodiment, the ratio of turns of the secondary winding to the number of turns on the primary winding 16 and 18 is in the order of 200:1, although this can vary depending on the relative input and output voltages required and the particular application of the power converter.

The secondary winding 32 is suitably connected to the load 34. Where a regulated AC output voltage is desired, the secondary winding 32 is connected directly to the load 34. Where the desired output is a DC regulated voltage, a voltage multiplying rectifier of one to even 12 or more stages is provided in the output, as will be fully described with regard to FIG. 4.

Figure 2:
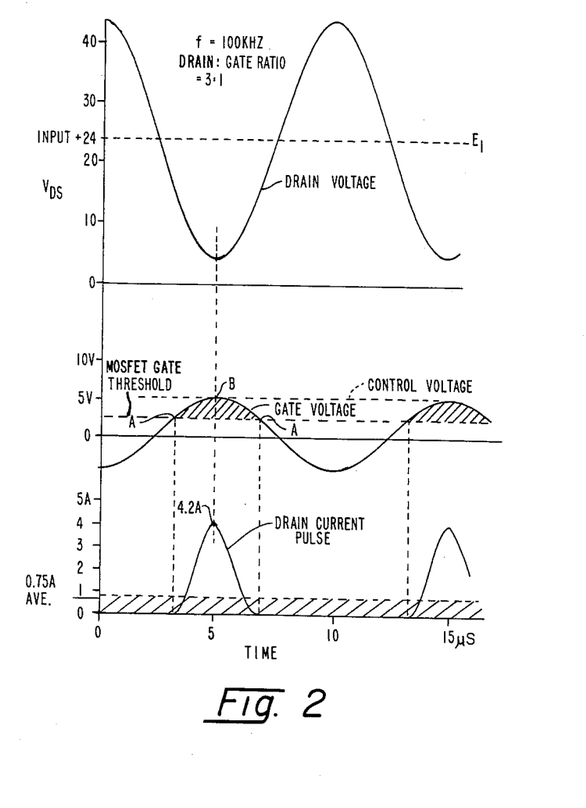
FIG. 2 is a timing diagram of the various signals of the MOSFET during operation of the FIG. 1 embodiment.
Figure 3:
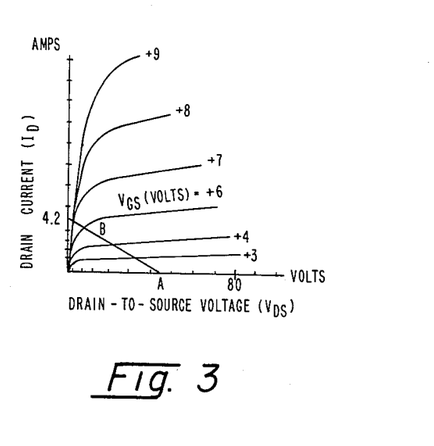
FIG. 3 is a typical, output-characteristic curve for an n-channel enhancement type MOSFET of the type utilized in the device shown in FIG. 1.

As will be more evident hereinafter, when the +VDC input is applied to the terminal 10, the secondary winding 32 and its stray capacitance will function as a resonating circuit which will generate a sinusoidal voltage across the inductive winding 16. The closed loop path 40 defined by the capacitor 14, winding 16 and the path between the source and drain terminals of the FET function as a path for the drain current pulses to flow. As shown in FIGS. 2 and 3, the resonating signal provided in the secondary winding will result in a self-sustaining oscillating signal on the drain and an oscillating signal on the gate (applied from the secondary winding 32 to the primary winding 18), both at the resonant frequency.

The drain voltage will oscillate about the unregulated +VDC input at the terminal 10, which is illustrated at +24 VDC, at a maximum peak amplitude at about +44 volts at a minimum peak amplitude at about +4 volts, as previously described. At such values the unregulated input voltage would have to drop below +20 VDC before the MOSFET 22 saturates. Similarly, the gate voltage will have a maximum peak value of about +6 VDC, above the threshold level of about +2.5 VDC, as illustrated in FIG. 3 and well within the rated value of about +/−20 VDC. The gate voltage will oscillate 180 out of phase with the drain voltage as is evident by the fact that the transmission path between the drain and source becomes more conductive as the gate voltage increases, resulting in the drain voltage being pulled toward ground. Conversely, the transmission path between the drain and source becomes less conductive as the gate voltage decreases.

As indicated in FIGS. 2 and 3, as the gate voltage increases beyond its threshold value of +2.5 VDC illustrated at point A toward point B, the MOSFET begins to conduct producing the drain current pulse shown in FIG. 2. As the gate voltage increases to the maximum value of +6 VDC at point B, the drain current increases to the maximum value (illustated in FIGS. 2 and 3 at 4.2 amps). The gate voltage then decreases back to the threshold level at point B, which results in the drain current pulse decreasing to zero. During the period of conduction the current flows through the FET 22 around the loop 40, and specifically through the primary winding 16. During the period of conduction, energy is delivered to the resonance of the secondary winding 32 of the transformer 20 which replaces precisely the energy loss of the previous cycle and so maintain a constant amplitude when under closed-loop regulation control. The voltage is applied to the voltage-multiplying rectifier 38 so as to establish the DC voltage applied to load 34. It should be appreciated that in addition to such fixed factors as the winding ratios of the transformer, the DC voltage level provided across the load 34 will be proportion to the peak-to-peak amplitude of the drain voltage, which in turn will be a function of the energy delivered by drain current pulses under the control of the gate voltage. The greater the gate voltage exceeds the gate threshold level (within the limits of the FET) the greater the peak drain current until saturation effects are reached.

It is clear that the voltage levels provided across the primary winding 18 (which in the illustrated example includes a single turn) are clearly at levels compatable with the operating charactersitics of FET 22.

The voltage output level across load 34 can easily be regulated by controlling the positive peak amplitude of the voltage applied to the gate of the FET 22. This is easily accomplished as shown in FIG. 1 by connecting the gate to the control bus 42, which in turn is connected through diode 44 to the voltage regulator 46. The latter is designed to shift the entire gate sinusoid slightly negatively when the output voltage level rises above the rated level. This causes the positive peak gate voltage to become slightly less, resulting in somewhat smaller drain current pulses, less resonant energy and sinusoidal amplitude, and correspondingly less output voltage. Conversely, the voltage provided across resistor 30 will tend to shift the gate sinusoid positively toward increased output power and voltage until restrained by conduction in one of the diodes 44, 48, 52, 56, or 60.

Various other controls of different operating conditions can be selectively provided by connecting additional independently operable controls to the bus 42. For example, bus 42 can be connected though diode 48 to the overvoltage protector 50. The latter can be provided for detecting too much voltage or current from being applied to the load 34, where the latter, for example, is an anode of a CRT so as to prevent X-ray emission from the tube. If too much is detected control 50 will disable the power supply by placing a voltage less than one volt on the cathode of diode 48. This diode then asserts control by establishing a maximum positive peak gate voltage of about +2.0 volts which is below threshold and prevents drain current flow in FET 22. In addition, the bus 42 can be connected through diode 52 to the current limiter 54 where it is desirable to protect the power supply from current overloads. Either input or output current may be sensed to detect an overload which would cause current limiter 54 to reduce the cathode voltage of its diode 52 and assert control over teh power being converted by FET 22. A user remote on-off facility also can be provided by connecting the bus 42 through diode 56 to the remote on-off control 58 so that the user can easily turn the power supply off in a safe and efficient manner. Standard TTL voltage and current levels are sufficient. A TTL"1" level of +5 VDC on the cathode of diode 56 will permit normal operation, while a "0" sinking only 280 microamps will completely shut down the oscillator, given $E_1$ of +5 VDC and resistor 30 of 18 Kohms. Other controls can easily be added to the control bus by adding additional diodes and control circuits, as indicated at 60 and 62.

Figure 4:
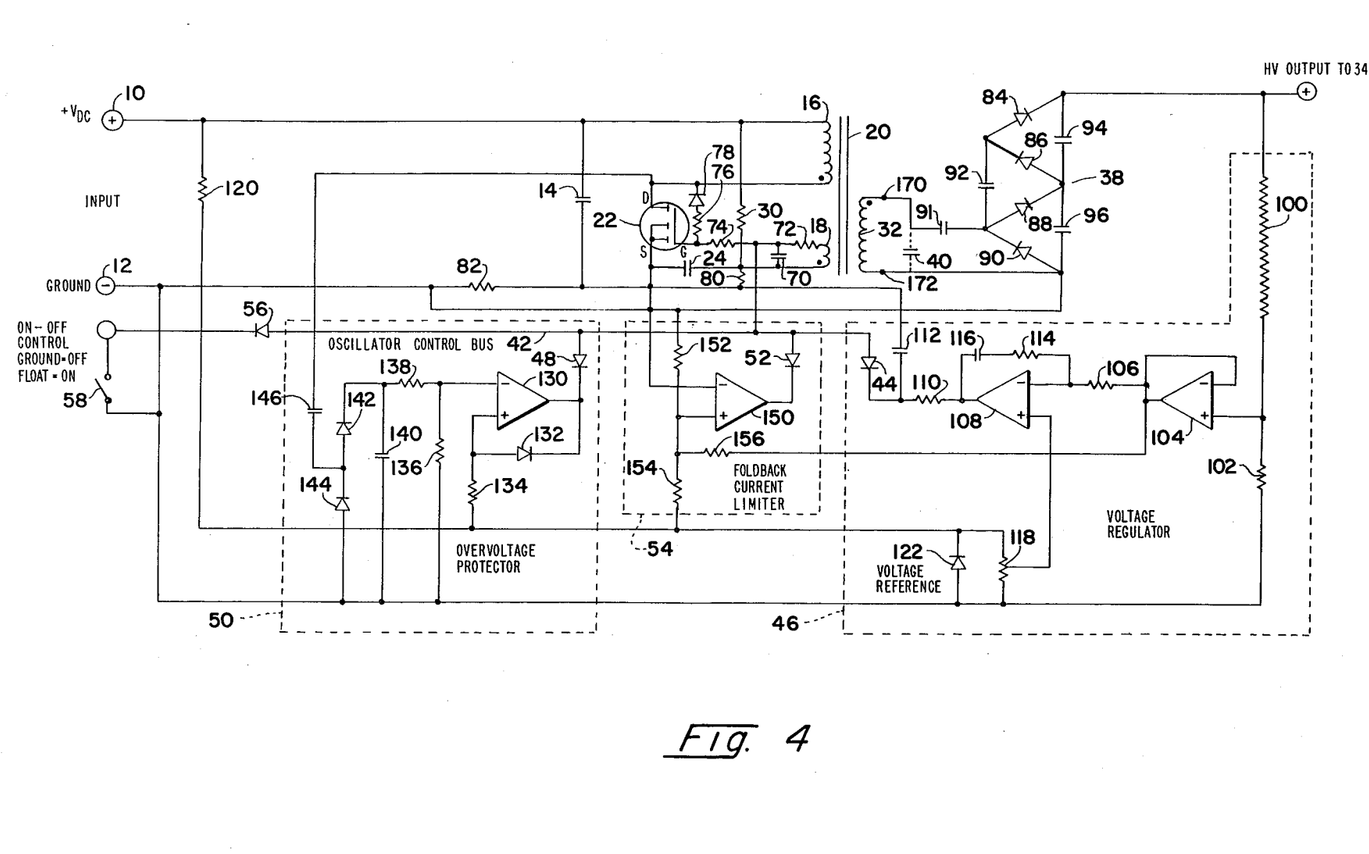
FIG. 4 is a more detailed schematic diagram of the preferred embodiment of the present invention.

The foregoing will be more apparent from the description of the more detailed embodiment of the power converter shown in FIG. 4. As shown the gate circuit of FET 22 includes an additional capacitor 70 having one plate connected to the junction between capacitor 24 and the dot-polarity side of primary winding 18 of transformer 20 and its other plate connected through resistor 72 to the other side of winding 18 and through resistor 74 to the gate of the FET. The gate of FET 22 is connected through resistor 76 to the anode of diode 78, which in turn has its cathode connected to the drain of the FET. Resistor 76 and diode 78 are provided to prevent hard saturation of the FET (where the drain voltage drops to zero for a portion of the cycle of the drain voltage) and consequent excessive input current from the positive input terminal 10. A resistor 80 is connected at one end to the junction of capacitor 24 and the primary winding 18 and at its other end to the source terminal of FET 22. Resistors 30 and 80 together are the equivalent of resistor 30 from voltage $E_1$ in FIG. 1.

The voltage multiplier rectifier 38 includes the diodes 84, 86, 88 and 90 connected as a Cockroft-Walton voltage multiplier, in a well known manner. A capacitor 91 is provided at the input of the voltage multiplier rectifier and a 92 is connected between the anode of diode 88 and the cathode 86. Capacitors 94 and 96 are respectively connected between the anode of diode 86 and the cathode of diode 84, and between the anode of diode 90 and the cathode of diode 88. The junction of diode 90 and capacitor 96 is connected directly to the ground terminal 12 so that the regulated DC output voltage is established across the capacitors 94 and 96.

The voltage regulator 46 includes a voltage divider comprising resistors 100 and 102, connected at one end to the positive output terminal of the power supply for providing a voltage signal across the resistor 102 proportional to the output voltage of the power supply (in the order of +5 VDC), and the other end connected to system ground at terminal 12. The junction of the resistors 100 and 102 is connected to the noninverting input of the voltage follower 104 for buffering the voltage input from the output of the follower. Follower 104 has its inverting input connected to its output, with the output being connected through the resistor 106 to the negative input of the error amplifier 108. The latter has its output connected to resistor 110, which in turn is connected to the cathode of diode 44 which is bypassed to ground by capacitor 112 to provide a low impedance to the 100 kHz current pulses flowing in diode 44. The output of error amplifier 108 is also connected to the feedback capacitor, which in turn is connected to the feedback resistor 114, the latter being connected to the negative input of the amplifier 108. Resistor 114 and capacitor 116 are set in order to damp the regulator response preventing loop oscillation and providing fast, well-damped recovery time in response to load changes at the output of the power supply. The positive input of the amplifier is connected to receive the reference voltage, wherein the input is connected to the tap of the variable resistor 118, which in turn is connected across the temperature-compensated voltage reference 122, operated with current flowing from resistor 120.

Overvoltage protector 50 includes a comparator 130 having its output connected to the cathode of diode 48. The output of amplifier 130 is also connected to the cathode of feedback diode 132. The noninverting input of amplifier 130 is connected to the anode of feedback diode 132 and through resistor 134 to the voltage reference diode 122 of the voltage regulator 46. The inverting input of amplifier 130 is connected through resistor 136 to ground and through resistor 138 to the capacitor 140, which in turn is connected to ground. The resistor 138 is also connected to the cathode of diode 142, which in turn has its cathode connected through capacitor 146 to the drain of FET 22 and to the cathode of diode 144. The latter has its anode connected to system ground.

The current limiter 54 includes operational amplifier 150 having its output connected to the cathode of diode 52. The inverting input of amplifier 150 is connected through resistor 158 to the junction of resistor 82, capacitor 14, source of FET 22 and capacitor 112. The noninverting input of amplifier 150 is connected to the resistor divider including resistor 152 connected to system ground at terminal 12, and resistor 154 connected to voltage reference diode 122. The noninverting input of amplifier 150 is also connected through resistor 156 to the output of voltage follower 104.

With the gate voltage operating at about +6V peak, remote user on-off operation the control may be any suitable type of switching device, such as a TTL level chip, connected between the cathode of diode 56 and system ground so that when the switch is closed the gate of FET 22 will be connected through the diode 56 to system ground.

In operation the secondary winding 32 and its stray capacitance 40 will self-excite in response to the DC input signal applied at terminals 10 and 12, and resonate at the resonant frequency. This will generate an oscillating signal across the primary windings 16 and 18 so that the FET 22 operates in the manner previously described as part of a highly-regulated, very-high-voltage, low current power converter. For DC operation, the regulated voltage is generated at the output of the rectifier 38. For AC operation, it should be appreciated that the highly regulated voltage can be obtained at the terminals (shown at 170 and 172) of the secondary winding of the transformer, and that suitable means for measuring, or "sensing" the AC output voltage for the voltage regulator must be provided to replace the function of resistors 100 and 102.

With respect to the voltage regulator 46, the voltage applied across resistor 102 to the input of the voltage regulator 46 is proportional to the DC output signal of the power supply and is compared to the reference signal applied by diode 122 and set by resistor 118. Any difference between the voltages on the two inputs to amplifier 108 becomes an error voltage which is amplified to become a control voltage for FET 22. The output of the amplifier 108 is applied to the cathode of diode 44 and capacitor 112 so as to appropriately lower the positive peak voltage on the gate of FET 22 so as to reduce the conversion power of the latter. Should the voltage of the gate drop so that the voltage across the load 34 drops below the regulated level, the voltage across resistor 30 will tend to pull the voltage back up. The regulated output level of the power supply can be changed by adjusting the variable resistor 118 so as to adjust the reference value applied to the positive input of amplifier 108.

With respect to overvoltage protector 50, the voltage across capacitor 140 will closely equal the peak to peak drain voltage (less two diode drops provided by diodes 142 and 144). This voltage is closely proportional to the output voltage delivered to load 34 by virtue of a fixed transformer turns ratio and voltage-multiplying factor. A fraction of the voltage across capacitor 140 is applied across resistor 136 of the resistance divider provided by the resistors 136 and 138. This voltage input to amplifier 130 is compared to the reference voltage provided by the Zener diode 122. The voltage provided across the resistor 136 will be slightly less than that provided through resistor 134 under normal operating conditions so that the output of amplifier 130 will be positive and the diode 48 reversed biased. If for any reason, such as regulation failure, the sinusoidal drain voltage on FET 22 should rise, the peak to peak voltage measured across the capacitor 140 and the voltage across resistor 136 increases. At 5% to 20% above normal drain voltage, the voltage across resistor 136 will exceed the reference voltage provided across resistor 134 so that the output of amplifier 130 goes negative, and the diode 48 will conduct so as to pull the voltage on the gate of the FET 22 down toward system ground and the shut the FET off. Further, diode 132 will become conductive so that the reference voltage across resistor 134 will be pulled down to a value of one diode drop, perpetuating a latch off. Under these conditions it is necessary to remove the input power to allow the power supply to reset.

With regard to the current limiter, the voltage across shunt resistor 82 is a function of the input current drawn by the converter from the input source connected to terminals 10 and 12, which is applied to the inverting input of amplifier 150. Resistors 152 and 154 set a small reference voltage to the noninverting input of operational amplifier 150. So long as the input voltage at the noninverting input is greater than that at the inverting input, the output of the amplifier 150 will remain positive, and diode 52 will be reversed biased. If the input current exceeds that set by the reference signal, the output of amplifier 150 will go negative and the diode 52 will start conducting and take control of FET 22 from the voltage regulator 46. Diode 52 will function to maintain the voltage across shunt resistor 82 (and the converter input current) constant until the output voltage to load 34 can again rise to the point where voltage regulator 46 regains control. The addition of resistor 156 modifies the voltage on the noninverting input to 150 to increase with output voltage as represented by the output of buffer 104. This results in the current limit increasing with output voltage. Resistors 152, 154, and 156 are proportional so that even with zero output voltage enough current is allowed to pass through resistor 82 to permit start-up, but only at full output voltage is full input current permitted. Since input current is restricted with zero output voltage, usually to 10% to 20% of normal full-load input current, the power converter can tolerate output short circuits of any duration without overheating or damage, and yet recover to full output immediately upon release of the overload or short circuit.

Should the operator desire to turn the supply off, this can be accomplished by the switch provided at 58, which would pull the gate voltage to ground.

It should be appreciated that control of FET 22 is asserted by the overvoltage protector 50, the current limiter 54, the on-off remote control 58, or voltage regulator 46 on the basis of which has the lowest control voltage to its diode, in logical "OR" fashion.

The power supply using the FET 22 as a Class C amplifier provides a device which is significantly cheaper to manufacture than the above-noted prior art devices employing high-frequency switching. The gate voltage necessary for Class C operation very nicely matches the available voltage levels on the primary winding 18 even though the winding may include but a single turn in order to operate the resonating circuit at relatively high frequencies in the order of 100 kHz. As designed the embodiment shown can easily handle a wide range of power levels, e.g., between about 2 or 3 watts to as much as 100 watts using the same control circuits and changing only FET 22, transformer 20 and capacitor 14. Further, by using the gate voltage of the FET to control the output of the converter, simple controls, such as voltage regulation, can be employed in a logic OR sense to provide multiple function control of the power converter by simply connecting each control circuit to the control bus 42. In addition to voltage regulation other controls on the power supply can easily be provided, by connecting the controls to control bus 42. Where the power supply is utilized to drive the anode of a CRT, the overvoltage protector 50 prevents excessive voltage from being applied to the anode so as to prevent X-ray emission from the tube. If too much is detected the power converter will be disabled so that the voltage regulator can not override this control. In addition, current limiter 54 protects the power converter from output overloads which could overheat the converter. Finally, the user remote on-off facility provided at 58 enables the user to turn off the power supply in a safe and efficient manner. The output voltage of the converter of the type described in FIG. 4 can easily be designed to be provide a quick regulation recovery response to changes of load 34, with full recovery of 500 microseconds being possible.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A power converter for converting an unregulated level of DC input power to a regulated level of output power, said power converter comprising:

input means for receiving said unregulated level of input power;

a self-excited, sinusoidal, power oscillator, coupled to said input mans and including (1) signal resonating means for generating a resonating signal at a predetermined resonating frequency in response to said input power level, and (2) a field effect transistor, connected to operate as a non-saturating Class C amplifier, for controlling the power output of said oscillator, said transistor including (a) a pair of main terminals, copuled to said signal resonating means so that the voltage across said main terminals varies as a function of said resonant frequency in response to said input power, and (b) a control terminal for controlling the operation of said transistor as a non-saturating Class C amplifier so as to control the power output of said oscillator in response to and as a function of a drive signal;

means responsive to said resonating signal, for generating said drive signal at said resonating frequency;

means for controlling said drive signal so as to control the power output of said oscillator; and output means, coupled to said oscillator, for providing said regulated output power level to a load as a function of the power output of said oscillator.

2. A power converter according to claim 1, wherein said oscillator includes a transformer including at least one primary winding and a secondary winding, said signal resonating means includes said secondary winding of said transformer and said transistor has one of said main terminals coupled to said primary winding.

3. A power converter according to claim 2, wherein said transformer includes a second primary winding and said means for generatng said conrol signal includes said second winding.

4. A power converter according to claim 1, further includng means for preventing said transistor from operating in a saturated state.

5. A power converter according to claim 1, wherein said field effect transistor is a MOSFET.

6. A power converter according to claim 1, wherein said field effect transistor is an enhancement type MOSFET.

7. A power converter according to claim 1, wherein said means for controlling said control signal includes means for regulating the voltage applied to said load.

8. A power converter according to claim 7, wherein said voltage regulation means for regulating the voltage applied to said load includes signal comparison means for comparing the applied voltage applied to said load and a reference voltage, and means, responsive to said voltage regulation means, for adjusting said control signal in response to differences between said applied and reference voltages.

9. A power converter according to claim 1, wherein said means for controlling said control signal includes means for limiting the current output of said power converter.

10. A power converter according to claim 9, wherein said means for limiting the current output of said power converter includes means for folding back said current output to a predetermined level when said current output exceeds a preselected value.

11. A power converter according to claim 1, wherein said means for controlling said control signal includes means for protecting said load from overvoltage.

12. A power converter according to claim 11, wherein said means for protecting said load from overvoltage reduces said control signal when a short occurs across said load.

13. A power converter according to claim 12, where said means for protecting said load from overvoltage includes means for latching the reduced control signal when a short occurs across said load.

14. A power converter according to claim 1, wherein said means for controlling said control signal includes means, remotely operable by an operator, for grounding said control signal.

15. A power converter according to claim 1, wherein said means for controlling said control signal includes a control bus connected to said control terminal of said transistor, and means, coupled to said control bus, for controlling said control signal in accordance with any one of a plurality of operating conditions.

16. A power converter according to claim 15, wherein said means for controlling said control signal in accordance with any one of a plurality of operating conditions includes voltage regulation means for regulating the voltage applied to said load.

17. A power converter according to claim 16, wherein said voltage regulation means for regulating the voltage applied to said load includes signal comparison means, connected to said signal bus, for comparing the applied voltage applied to said load and a reference voltage, and means, responsive to said voltage regulation means, for adjusting said control signal in response to differences between said applied and reference voltages.

18. A power converter according to claim 17, wherein said means for adjusting said control signal includes means for increasing said control signal in response to a decrease of said applied voltage below a regulated value and diode means connected to said control bus for decreasing said control signal in response to an increase of said applied voltage above said regulated value.

19. A power converter according to claim 15, wherein said means for controlling said control signal in accordance with any one of a plurality of operating conditions includes means for limiting the current output of said power converter.

20. A power converter according to claim 19, wherein said means for limiting the current output of said power converter includes means for folding back said current output to a predetermined level when said current output exceeds a preselected value.

21. A power converter according to claim 15, wherein said means for controlling said control signal in accordance with anyone of a plurality of operating conditions includes means, connected to said control bus for protecting said load from overvoltage.

22. A power converter according to claim 21, wherein said means for protecting said load from overvoltage reduces said control signal when a short occurs across said load.

23. A power converter according to claim 22, where said means for protecting said load from overvoltage includes means for latching the reduced control signal when a short occurs across said load.

24. A power converter according to claim 15, wherein said means for controlling said control signal in accordance with any one of a plurality of operating conditions includes means, connected to said control bus and remotely operable by an operator, for grounding said control signal.

* * * * *

UNITED STATES PATENT AND TRADEMARK OFFICE
CERTIFICATE OF CORRECTION

PATENT NO. : 4,757,433
DATED      : July 12, 1988
INVENTOR(S): William F. Santelmann, Jr.

It is certified that error appears in the above-identified patent and that said Letters Patent is hereby corrected as shown below:

Claim 1, column 13, line 4, delete "mans" and substitute therefor -- means --;

Claim 1, column 13, line 11, delete "copuled" and substitute therefor -- coupled --;

Claim 3, column 13, line 34, delete "generatng" and substitute therefor -- generating --;

Claim 3, column 13, line 34, delete "conrol" and substitute therefor -- control --;

Claim 4, column 13, line 37, delete "includng" and substitute therefor -- including --;

Claim 21, column 14, line 51, delete "anyone" and substitute therefor -- any one --.

Signed and Sealed this

Ninth Day of May, 1989

*Attest:*

DONALD J. QUIGG

*Attesting Officer*     *Commissioner of Patents and Trademarks*